United States Patent
Matsuo et al.

(10) Patent No.: US 9,493,041 B2
(45) Date of Patent: Nov. 15, 2016

(54) RUN-FLAT TIRE

(75) Inventors: Shigeaki Matsuo, Siginami-ku (JP); Koji Masaki, Higashimurayama-shi (JP)

(73) Assignee: BRIDGESTONE CORPORATION, Tokyo (JP)

( * ) Notice: Subject to any disclaimer, the term of this patent is extended or adjusted under 35 U.S.C. 154(b) by 559 days.

(21) Appl. No.: 13/395,391

(22) PCT Filed: Sep. 10, 2009

(86) PCT No.: PCT/JP2009/065866
§ 371 (c)(1),
(2), (4) Date: Mar. 9, 2012

(87) PCT Pub. No.: WO2011/030431
PCT Pub. Date: Mar. 17, 2011

(65) Prior Publication Data
US 2012/0168051 A1    Jul. 5, 2012

(51) Int. Cl.
B60C 15/06     (2006.01)
B60C 17/00     (2006.01)
C08L 7/00      (2006.01)
C08L 9/00      (2006.01)
C08L 21/00     (2006.01)

(52) U.S. Cl.
CPC .............. B60C 17/0009 (2013.04); C08L 7/00 (2013.01); C08L 9/00 (2013.01); B60C 2001/0033 (2013.04); C08L 21/00 (2013.01)

(58) Field of Classification Search
CPC combination set(s) only.
See application file for complete search history.

(56) References Cited

U.S. PATENT DOCUMENTS

2005/0236087 A1* 10/2005 Nishizaki ................ C08L 9/00
                                                 152/517

FOREIGN PATENT DOCUMENTS

| EP | 1860146 A1 | 11/2007 |
|---|---|---|
| EP | 2060604 A1 | 5/2009 |
| JP | 11-302459 A | 11/1999 |
| JP | 2003-213040 A | 7/2003 |
| JP | 2005-280534 A | 10/2005 |
| JP | 2007-510004 A | 4/2007 |
| JP | 2007-224305 A | 9/2007 |
| JP | 2007-276589 A | 10/2007 |
| JP | 2008-031207 A | 2/2008 |
| JP | 2008-063364 A | 3/2008 |
| JP | 2008-106148 A | 5/2008 |

OTHER PUBLICATIONS

Westall (The molecular weight distribution of natural rubber latex, Polymer, vol. 9, 1968, 243-248).*
Machine translation of JP2007-276589, 2007.*
Extended European Search Report issued Apr. 19, 2013 in European Patent Application No. 09849211.9 to Bridgestone Corporation.
Database WPI, Week 200540, Thomson Scientific, London, GB; AN 2005-389057; XP-002695125, May 19, 2005.
Office Action issued Nov. 26, 2013 in corresponding Chinese Application No. 200980162361.3.
Communication dated Sep. 15, 2014, issued by the European Patent Office in European application No. 09849211.9.
Communication from the Chinese Patent Office issued Jul. 14, 2014, in counterpart Chinese Application No. 200980162361.3.

* cited by examiner

*Primary Examiner* — Wenwen Cai
(74) *Attorney, Agent, or Firm* — Sughrue Mion, PLLC

(57) ABSTRACT

The present invention relates to a run-flat tire employing a rubber composition capable of improving processability without reducing the durability during run-flat traveling. More specifically, the present invention relates to a run-flat tire comprising a bead filler 7 and a pair of side-reinforcing rubber layers 8. At least one of the bead filler 7 and the side-reinforcing rubber layer 8 employs a rubber composition obtained by adding 3 to 10 parts by mass of sulfur and 0.1 to 30 parts by mass of a low-molecular-weight conjugated diene-based polymer (B) having a weight average molecular weight in the range of 2,000 to 10,000, to 100 parts by mass of a rubber component (A) containing at least a natural rubber or polyisoprene rubber and having a weight average molecular weight in the range of 150,000 to 2,000,000.

5 Claims, 1 Drawing Sheet

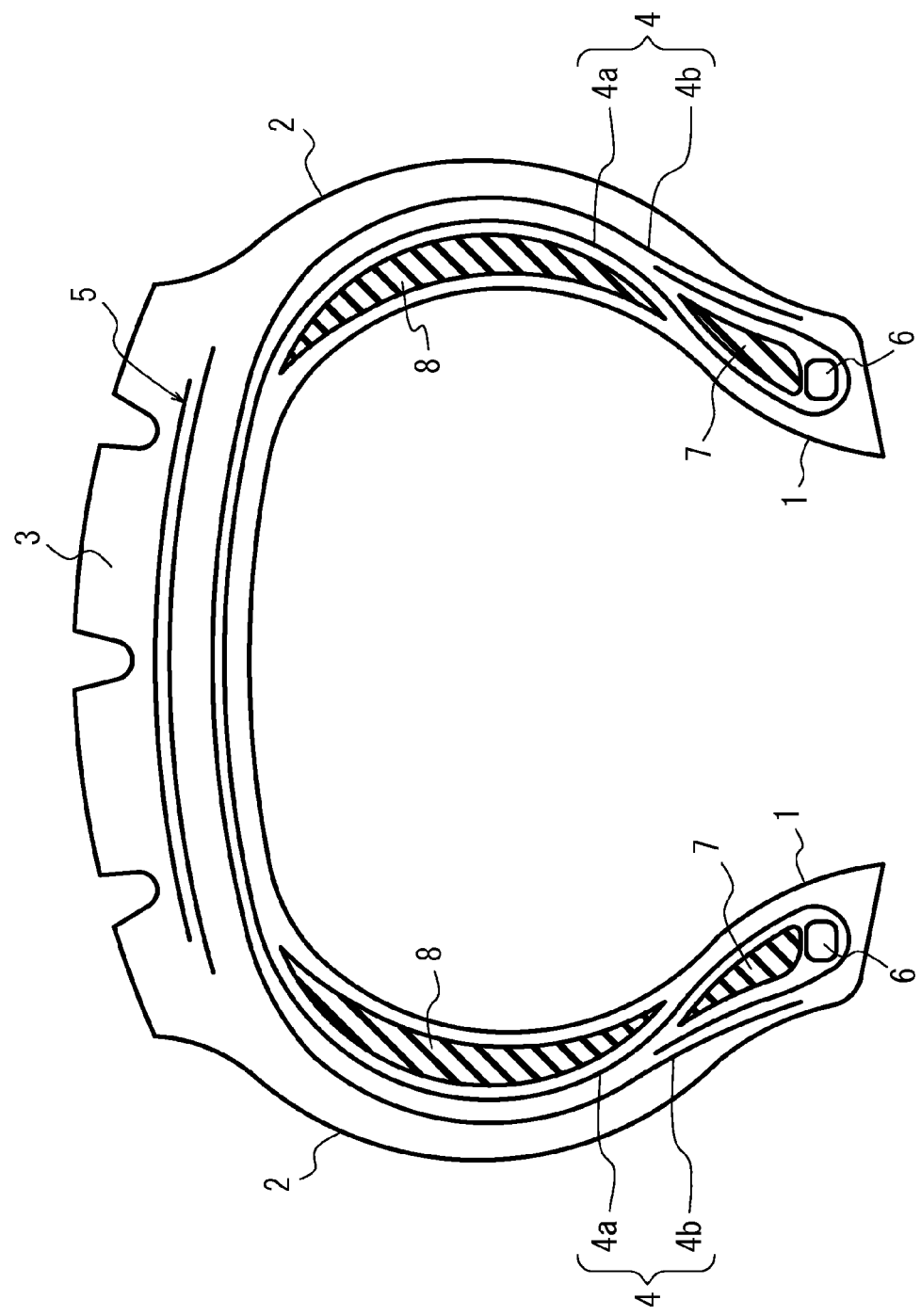

RUN-FLAT TIRE

CROSS REFERENCE TO RELATED APPLICATIONS

This application is a National Stage of International Application No. PCT/JP2009/065866 filed on Sep. 10, 2009, the contents of all of which are incorporated herein by reference in their entirety.

TECHNICAL FIELD

The present invention relates to a run-flat tire, and in particular to a run-flat tire employing a rubber composition capable of improving processability without reducing durability during run-flat traveling.

RELATED ART

Conventionally, as a tire capable of safely traveling for a certain distance even in a state where inner pressure of the tire lowers due to a puncture and the like, namely, a run-flat tire, there is known a side-reinforced run-flat tire in which a side-reinforcing rubber layer having a crescent-shaped cross section is disposed in a side wall portion of the tire to improve the rigidity of the side wall portion. However, during the travel under the state where the inner pressure of the tire is lowered, in other words, during the run-flat traveling, the side-reinforcing rubber layer increasingly deforms with the increase in deformation of the side wall portion of the tire. This leads to an increase in heat generation at the side-reinforcing rubber layer, and in some cases, the temperature of the tire reaches a high temperature of 200° C. or more, which possibly causes breakage of a rubber component itself in the side-reinforcing rubber layer, or causes breakage of a crosslinked portion formed through vulcanization between rubber components. In such a case, the elastic modulus of the side-reinforcing rubber layer lowers; the deformation of the tire further increases; the heat generation increases at the side wall portion; eventually, the side-reinforcing rubber layer exceeds its own breaking limit; and then, the tire may result in breakdown at a relatively early stage.

As a means for retarding the occurrence of the breakdown, there is known a method of strengthening the elastic modulus of the side-reinforcing rubber layer by changing the compositional formulation of the rubber used in the side-reinforcing rubber layer of the tire, or reducing the loss tangent (tan δ) of the side-reinforcing rubber layer to suppress the heat generation of the side-reinforcing rubber layer itself.

From the viewpoint of improvement in the processability of the rubber composition, there is known a method for reducing viscosity of the rubber composition by adding a softening agent such as oil, or improving the tackiness of the rubber composition by adding tackifier (tackiness-imparting agent) such as resin (see, for example, Patent Documents 1 to 3, and Non-patent Document 1). However, in the case where the rubber composition having processability improved as described above is used in the side-reinforcing rubber layer, the loss tangent (tan δ) increases in the side-reinforcing rubber layer, causing a problem of reducing the durability during the run-flat traveling.

RELATED ART DOCUMENT

Patent Documents

Patent Document 1: Japanese Patent Application Laid-open No. H11-302459

Patent Document 2: Japanese Patent Application Laid-open No. 2003-213040
Patent Document 3: Japanese Patent Application (Translation of PCT Application) Laid-open No. 2007-510004

Non-Patent Document

Non-patent Document 1: F. F. WOLNY and J. J. LAMB, in Kautsuch, Gummi Kunstoffe (1984) 37/7, pp 601-603

DISCLOSURE OF THE INVENTION

Problems to be Solved by the Invention

In view of the circumstances described above, an object of the present invention is to solve the conventional problems described above, and to provide a run-flat tire employing a rubber composition capable of improving processability without reducing the durability during run-flat traveling.

Means for Solving the Problem

The present inventors made a keen study to achieve the object described above, and found that it is possible to suppress the reduction in the durability during run-flat traveling while maintaining a high degree of processability of the rubber composition, by using, in place of the softening agent or tackifier, a rubber composition obtained by adding a low-molecular-weight conjugated diene-based polymer to a rubber component having a specific weight average molecular weight and a specific composition, at at least one of a bead filler and a side-reinforcing rubber layer of the tire. As a result, the present inventors made the the present invention.

More specifically, a first run-flat tire according to the present invention provides a run-flat tire comprising a side wall portion, a tread, a carcass, a bead core, and a bead filler. The bead filler employs a rubber composition obtained by adding 3 to 10 parts by mass of sulfur and 0.1 to 30 parts by mass of a low-molecular-weight conjugated diene-based polymer (B) having a weight average molecular weight in terms of polystyrene standard in the range of 2,000 to 10,000 measured with a gel permeation chromatography, to 100 parts by mass of a rubber component (A) containing at least a natural rubber or polyisoprene rubber and having a weight average molecular weight in terms of polystyrene standard in the range of 150,000 to 2,000,000 measured with the gel permeation chromatography.

Further, a second run-flat tire according to the present invention provides a run-flat tire comprising a side wall portion, a tread, a carcass, and a side-reinforcing rubber layer. The side-reinforcing rubber layer employs a rubber composition obtained by adding 3 to 10 parts by mass of sulfur and 0.1 to 30 parts by mass of a low-molecular-weight conjugated diene-based polymer (B) having a weight average molecular weight in terms of polystyrene standard in the range of 2,000 to 10,000 measured with a gel permeation chromatography, to 100 parts by mass of a rubber component (A) containing at least a natural rubber or polyisoprene rubber and having the weight average molecular weight in terms of polystyrene standard in the range of 150,000 to 2,000,000 measured with the gel permeation chromatography.

Yet further, a third run-flat tire according to the present invention provides a run-flat tire comprising a side wall portion, a tread, a carcass, a bead core, a bead filler, and a side-reinforcing rubber layer. At least one of the bead filler and the side-reinforcing rubber layer employs a rubber composition obtained by adding 3 to 10 parts by mass of sulfur and 0.1 to 30 parts by mass of a low-molecular-weight conjugated diene-based polymer (B) having a weight average molecular weight in terms of polystyrene standard in the range of 2,000 to 10,000 measured with a gel permeation chromatography, to 100 parts by mass of a rubber component (A) containing at least a natural rubber or polyisoprene rubber and having a weight average molecular weight in terms of polystyrene standard in the range of 150,000 to 2,000,000 measured with the gel permeation chromatography.

In a preferred example of the run-flat tire of the present invention, the rubber component (A) is formed by at least one type selected from a group consisting of a natural rubber, a polyisoprene rubber, a styrene-butadiene copolymer rubber, a polybutadiene rubber, and an isobutylene isoprene rubber.

In another preferred example of the run-flat tire of the present invention, the low-molecular-weight conjugated diene-based polymer (B) is polybutadiene.

In another preferred example of the run-flat tire of the present invention, the rubber composition further contains a carbon black and/or silica.

EFFECT OF THE INVENTION

According to the present invention, it is possible to provide a run-flat tire capable of suppressing the reduction in the durability during run-flat traveling while maintaining the processability of the rubber composition at a higher level, by using, in place of a softening agent or tackifier, a rubber composition obtained by adding a predetermined amount of sulfur and a predetermined amount of a low-molecular-weight conjugated diene-based polymer to a rubber component having a specific weight average molecular weight and a specific composition, at at least one of a bead filler and a side-reinforcing rubber layer of the tire.

BRIEF DESCRIPTION OF THE DRAWINGS

FIG. 1 is a sectional view of an embodiment of a run-flat tire according to the present invention.

BEST MODE FOR CARRYING OUT THE INVENTION

Hereinbelow, the present invention will be described in detail with reference to the drawing. FIG. 1 is a sectional view illustrating an embodiment of a run-flat tire according to the present invention. The tire illustrated in FIG. 1 includes a pair of right and left bead portions 1, a pair of side wall portions 2, and a tread 3 continuing to both of the side wall portions 2. Further, the tire includes a radial carcass 4 toroidally extending between the pair of the bead portions 1 and reinforcing each of the portions 1, 2, and 3, a belt 5 formed by two belt layers disposed outwards in the tire radial direction of a crown portion of the carcass 4, a bead filler 7 disposed outwards in the tire radial direction of a ring-shaped bead core 6 embedded in each of the bead portions 1, and a pair of side-reinforcing rubber layers 8 each disposed on the inner side of the carcass 4 of each of the side wall portions 2.

In the tire illustrated in the drawing as an example, the radial carcass 4 includes a folded carcass ply 4a having a folded portion turned up outwards in the radial direction from the inner side to the outer side in the tire width direction around the bead core 6, and a down carcass ply 4b disposed on the outer side of the folded carcass ply 4a. Note that, in the tire according to the present invention, the structure of the carcass and the number of the plies are not limited to this example. Further, the bead filler 7 is disposed between the body portion and the folded portion of the folded carcass ply 4a and outwards in the tire radial direction of the bead core 6. Note that the side-reinforcing rubber layer 8 illustrated in the drawing as an example has a crescent-shaped cross section. However, the cross-sectional shape of the side-reinforcing rubber layer 8 is not specifically limited as long as the side-reinforcing rubber layer 8 has a side-reinforcing function.

In the tire illustrated in FIG. 1, the belt 5 formed by two belt layers is disposed outwards in the tire radial direction of the crown portion of the radial carcass 4, and the belt layers are each formed in general by rubberizing a cord extending at an angle with respect to an equator of the tire. The two belt layers form the belt 5 in a manner such that cords constituting the belt layers are layered so as to cross each other, and disposed on both sides of the equatorial plane. Note that, in FIG. 1, the belt 5 is formed by the two belt layers. However, in the tire according to the present invention, the number of the belt layers constituting the belt 5 is not limited to this. Further, the run-flat tire according to the the present invention may have a belt reinforcing layer disposed outwards in the tire radial direction of the belt 5 and formed by rubberizing cords arranged substantially in parallel to the tire circumferential direction.

At least one of the bead filler 7 and the side-reinforcing rubber layer 8 of the run-flat tire according to the present invention is required to employ a rubber composition obtained by adding 0.1 to 30 parts by mass of a low-molecular-weight conjugated diene-based polymer (B) having the weight average molecular weight in terms of polystyrene standard in the range of 2,000 to 10,000 measured with a gel permeation chromatography and 3 to 10 parts by mass of sulfur, to 100 parts by mass of the rubber component (A) having the weight average molecular weight in terms of polystyrene standard in the range of 150,000 to 2,000,000 measured with a gel permeation chromatography and containing at least natural rubber or polyisoprene rubber. Note that the tire illustrated in the drawing as an example includes both the bead filler 7 and the side-reinforcing rubber layer 8. However, the tire according to the present invention is only necessary to include the bead filler and/or the side-reinforcing rubber layer employing the rubber composition containing the above-described rubber component (A), the low-molecular-weight conjugated diene-based polymer (B), and the sulfur.

As a result of the study made by the present invention, it is found that it is possible to improve the tackiness of the rubber composition, and suppress the increase in the loss tangent (tan δ) of the rubber composition while reducing the Mooney viscosity, by adding, to the rubber composition, the low-molecular-weight conjugated diene-based polymer (B) having the weight average molecular weight in terms of polystyrene standard in the range of 2,000 to 10,000 measured with a gel permeation chromatography, in placed of the softening agent or tackifier generally added from the viewpoint of improving the processability. Thus, according to the run-flat tire of the present invention, it is possible to apply the rubber composition having excellent processability to the bead filler 7 and/or the side-reinforcing rubber layer 8 without reducing the durability during the run-flat traveling.

The rubber component (A) employed in the rubber composition is required to contain at least one of a natural rubber (NR) and a polyisoprene rubber (IR). In the case where the rubber component (A) does not contain the natural rubber and the polyisoprene rubber, the durability during run-flat traveling deteriorates. In addition to the natural rubber and the polyisoprene rubber, the rubber component (A) includes a high-molecular-weight conjugated diene-based polymer such as styrene-butadiene copolymer rubber (SBR), polybutadiene rubber (BR), and isobutylene isoprene rubber (IIR). Note that it may be possible to use the above-described rubber component (A) either single or in combination of two or more types thereof. Further, in the case where the rubber component (A) contains the styrene-butadiene copolymer rubber, the percentage of a styrene unit relative to the entire rubber component (A) is preferably less than 30% by mass, further preferably less than 20% by mass, yet further preferably less than 15% by mass. In the case where the percentage of the styrene unit relative to the entire rubber component (A) is less than 30% by mass, the rubber component (A) exhibits excellent compatibility with the low-molecular-weight conjugated diene-based polymer (B).

Further, the rubber component (A) is required to have the weight average molecular weight in terms of polystyrene standard in the range of 150,000 to 2,000,000 measured with a gel permeation chromatography. In the case where the weight average molecular weight in terms of polystyrene standard is less than 150,000, the viscosity in an unvulcanized state is undesirably low. This leads to an insufficient torque at the time of kneading, possibly resulting in the insufficient kneading. On the other hand, in the case where the weight average molecular weight in terms of polystyrene standard exceeds 2,000,000, the viscosity in the unvulcanized state significantly rises, and hence, the processability during the kneading and the molding processability significantly deteriorate. Note that there is no specific limitation on a method for manufacturing the rubber component (A). It may be possible to employ, for example, a method similar to the method for manufacturing the low-molecular-weight conjugated diene-based polymer (B), which will be described below.

The rubber composition contains 0.1 to 30 parts by mass of the low-molecular-weight conjugated diene-based polymer (B) having the the weight average molecular weight in terms of polystyrene standard in the range of 2,000 to 10,000 measured with the gel permeation chromatography relative to 100 parts by mass of the rubber component (A). In the case where the amount of the low-molecular-weight conjugated diene-based polymer (B) is less than 0.1 parts by mass, the effect of imparting processability to the rubber composition is insufficient. On the other hand, in the case where the amount of the low-molecular-weight conjugated diene-based polymer (B) exceeds 30 parts by mass, the fracture characteristics of the vulcanized rubber tends to deteriorate.

The low-molecular-weight conjugated diene-based polymer (B) used in the rubber composition is required to have the weight average molecular weight in terms of polystyrene standard in the range of 2,000 to 10,000 measured with the gel permeation chromatography, preferably in the range of 2,000 to 6,000. In the case where the weight average molecular weight in terms of polystyrene standard is less than 2,000, the low loss performance deteriorates, and the durability during run-flat traveling reduces. On the other hand, in the case where the weight average molecular weight in terms of polystyrene standard exceeds 10,000, the processability of the rubber composition reduces.

It is preferable that, in the low-molecular-weight conjugated diene-based polymer (B), the percentage of the aromatic vinyl compound unit relative to the entire monomer unit of the polymer (B) is less than 5% by mass. In some cases, the low-molecular-weight conjugated diene-based polymer (B) contains styrene-butadiene copolymer and the like. In such a case, if the percentage of the styrene unit relative to the entire polymer (B) is 5% by mass or more, the heat release property deteriorates, and hence, there is a possibility that the durability during run-flat traveling cannot be sufficiently secured.

It is preferable that, in the low-molecular-weight conjugated diene-based polymer (B), the percentage of a vinyl bonding amount in the conjugated diene compound moiety is in the range of 30% to 80%. In the case where the vinyl bonding amount in the conjugated diene compound moiety is less than 30%, the effect of improving the durability is undesirably small. On the other hand, in the case where the vinyl bonding amount exceeds 80%, the viscosity in the unvulcanized state rises. This results in a significant reduction in the processability as well as a reduction in the effect of improving the durability.

As the low-molecular-weight conjugated diene-based polymer (B), it is preferable to employ a single polymer of the conjugated diene compound, or a copolymer formed by the aromatic vinyl compound and the conjugated diene compound. The conjugated diene compound as a monomer includes 1,3-butadiene, isoprene, 1,3-petadiene, 2,3-dimethylbutadiene, 2-phenyl-1,3-butadiene, and 1,3-hexadiene. Among them, 1,3-butadiene is preferable. Further, the aromatic vinyl compound as the monomer includes styrene, p-methyl styrene, m-methyl styrene, p-tert-butyl styrene, a-methyl styrene, chloromethyl styrene, and vinyl toluene. Thus, as the low-molecular-weight conjugated diene-based polymer (B), polybutadiene is especially preferable. Note that it may be possible to use these monomers either alone or in combination of two or more types thereof There is no specific limitation on the low-molecular-weight conjugated diene-based polymer (B). The low-molecular-weight conjugated diene-based polymer (B) can be obtained, for example, by, in a hydrocarbon solvent solution inert to a polymerization reaction, polymerizing the conjugated diene compound in a monomer state alone, or polymerizing a mixture of the aromatic vinyl compound and the conjugated diene compound in a monomer state. In the case where at least one functional group is introduced in a molecule of the low-molecular-weight conjugated diene-based polymer (B), the low-molecular-weight conjugated diene-based polymer (B) can be obtained by (1) polymerizing the monomer with a polymerization initiator to generate a polymer having a polymerization active portion, and modifying the polymerization active portion with various modifiers, or (2) polymerizing the monomer using a polymerization initiator having a functional group such as a polymerization initiator having an Sn—Li, C—Li or N—Li bond.

As the polymerization initiator used for synthesizing the polymer (B), it is preferable to use an alkali metal compound, further preferable to use a lithium compound, and yet further preferable to use a hydrocarbyl lithium and lithium amide compound. Note that, in the case where the lithium compound is used as the polymerization initiator, the aromatic vinyl compound and the conjugated diene compound are polymerized through anionic polymerization. In the case where the hydrocarbyl lithium is used as the polymerization initiator, it is possible to obtain a polymer having a hydrocarbyl group at the polymerization starting end and the polymerization active portion at the other end. In the case where the lithium amide compound is used as the polymerization initiator, it is possible to obtain a polymer having a nitrogen-containing functional group at the polymerization starting end and the polymerization active portion at the other end. The thus obtained polymer is not modified through the modifier, and can be used as the low-molecular-weight conjugated diene-based polymer (B) having at least one functional group. Note that the amount of the polymerization initiator used in the polymerization is preferably in the range of 0.2 to 20 mmol per 100 g of a monomer.

The hydrocarbyl lithium includes ethyl lithium, n-propyl lithium, isopropyl lithium, n-butyl lithium, sec-butyl lithium, tert-octyl lithium, n-decyl lithium, phenyl lithium, 2-naphthyl lithium, 2-butyl-phenyl lithium, 4-phenylbutyl lithium, cyclohexyl lithium, cyclopentyl lithium, and a reaction product of diisopropenylbenzen and butyl lithium. Among them, it is preferable to use alkyl lithium such as ethyl lithium, n-propyl lithium, isopropyl lithium, n-butyl lithium, sec-butyl lithium, tert-octyl lithium, and n-decyl lithium, and is further preferable to use n-butyl lithium.

As described above, there is no specific limitation on the method for manufacturing the conjugated diene-based polymer using the polymerization initiator. For example, the polymer (B) can be manufactured, for example, by polymerizing the monomer in a hydrocarbon solvent solution inert to a polymerization reaction. The hydrocarbon solvent solution inert to a polymerization reaction includes propane, n-butane, isobutane, n-pentane, isopentane, n-hexane, cyclohexane, propene, 1-butene, isobutene, trans-2-butene, cis-2-butene, 1-pentene, 2-pentene, 1-hexene, 2-hexene, benzene, toluene, xylene, and ethylbenzene. It may be possible to use the above-described component either single or in combination of two or more types thereof.

The polymerization reaction may be performed under the existence of randomizer. The randomizer can control a micro structure of the conjugated diene compound moiety of the polymer. More specifically, the randomizer has functions of controlling the vinyl bonding amount of the conjugated diene compound moiety of the polymer, and randomizing the conjugated diene compound unit and the aromatic vinyl bonding unit in the copolymer. The randomizer described above includes dimethoxy benzene, tetrahydrofuran, dimethoxyethane, diethylene glycol dibutyl ether, diethylene glycol dimethyl ether, bistetrahydrofuryl propane, triethylamine, pyridine, N-methylmorpholine, N,N,N',N'-tetramethyl ethylenediamine, 1,2-dipiperidinoethane, potassium-t-amylate, potassium-t-butoxide, and sodium-t-amylate. The amount of randomizer used is set, preferably, in the range of 0.1 to 100 molar equivalents per mol of the polymerization initiator.

It is preferable that the anionic polymerization is performed through solution polymerization. The concentration of the monomer described above in the polymerization reaction solution is preferably in the range of 5 to 50% by mass, and further preferably in the range of 10 to 30% by mass. Note that, in the case where the conjugated diene compound and the aromatic vinyl compound are used at the same time, the percentage of the aromatic vinyl compound in the mixture of the monomers may be set as required depending on the amount of the aromatic vinyl compound of the target copolymer. Further, there is no specific limitation on the type of the polymerization, and it may be possible to employ either a batch type or continuous type.

The polymerization temperature of the anionic polymerization is preferably in the range of 0 to 150° C., and further preferably in the range of 20° C. to 130° C. The polymerization described above may be performed under a generated pressured. However, in general, it is preferable that the polymerization is performed under a pressure required to sufficiently maintain the monomer used in the polymerization in a substantially liquid phase. In the case where the polymerization reaction is performed under a pressure higher than the generated pressured, it is preferable to pressurize the reaction system with an inert gas. The raw materials such as monomers used in the polymerization, polymerization initiator, and solvent are preferably used after removal of reaction obstructing substances such as water, oxygen, carbon dioxide, protonic compound and the like.

Further, for a (co)polymer having the above-described polymerization active portion, it is preferable to modify a polymerization active portion of the (co)polymer with a modifier such as nitrogen-containing compound, silicon-containing compound, and tin-containing compound. In this case, the nitrogen-containing functional group, silicon-containing functional group, or tin-containing functional group can be introduced through the modification reaction.

The modification reaction to the polymerization active portion with the above-described modifier is preferable to be performed through solution reaction. Such a solution may contain the monomer used in the polymerization. There is no specific limitation on the reaction type of the modification reaction. It may be possible to employ either a batch type or a continuous type. Further, the reaction temperature of the modification reaction is not particularly limited as long as the reaction proceeds, and the reaction temperature in the polymerization reaction may be applied without change. Note that the amount of the modifier used is preferably in a range of 0.25 to 3.0 mol, more preferably 0.5 to 1.5 mol per 1 mol of the polymerization initiator used for manufacturing the copolymer.

The rubber composition used in the run-flat tire according to the present invention may be obtained by drying the reaction solution containing the polymer (B) to separate the polymer (B), and then, adding the resulting polymer (B) to the rubber component (A), or by mixing the reaction solution containing the polymer (B) with a rubber cement of the rubber component (A) in a solution state, and then drying the thus obtained substance to obtain a mixture of the rubber component (A) and the polymer (B).

For the rubber composition, it may be possible to use vulcanizing agents such as sulfur to cross-link the rubber component (A) and the low-molecular-weight conjugated diene-based polymer (B) to be a three-dimensional network structure. However, the low-molecular-weight conjugated diene-based polymer (B) has a small molecular weight, and is less likely to be cross-linked.

This possibly causes the tan δ of the rubber composition to increase through the flow of the polymer (B) not forming a cross-link. Thus, the rubber composition is required to have 3 to 10 parts by mass of sulfur relative to 100 parts by mass of the rubber component (A). By setting the amount of sulfur in the above-described range, even if the low-molecular-weight conjugated diene-based polymer (B) is used, it can be contained in the three-dimensional network structure with the conjugated diene portion of the rubber component (A) without causing any trouble, and the viscosity in the unvulcanized state can be effectively lowered without deteriorating the low loss performance. Further, in the case where the amount of sulfur is less than 3 parts by mass, the sulfur cannot contributes to the three-dimensional network structure through the sulfur, and the loss increases. This leads to a tendency that the durability during run-flat traveling reduces. On the other hand, in the case where the amount of sulfur exceeds 10 parts by mass, re-cross-link at the time of heat aging is promoted, so that the heat aging property of the rubber deteriorates. This leads to a tendency that the durability during run-flat traveling deteriorates due to the degradation through traveling.

It is preferable that the rubber composition further contains a filling agent. The filling agent includes carbon black, and silica. The carbon black is preferably in an FEF, SRF, HAF, ISAF, and SAF grades, further preferably in an HAF, ISAF, and SAF. On the other hand, as the silica, it is preferable to use wet-process silica and dry silica, and more preferable to use wet-process silica. It may be possible to use the filler either alone or in combination of two or more types thereof. Further, in the rubber composition, it is preferably that the amount of filling agent is set in the range of 30 to 90 parts by mass relative to the 100 parts by mass of the rubber component (A). In the case where the amount of filling agent is less than 30 parts by mass, the breakage resistance and the wear resistance of the vulcanized rubber cannot be sufficiently obtained. On the other hand, the amount of filling agent exceeds 90 parts by mass, there is a tendency of deterioration of processability.

In addition to the rubber component (A), the low-molecular-weight conjugated diene-based polymer (B), the vulcanizing agent such as sulfur, and the filling agent, it may be possible to add, to the rubber composition, a compounding agent generally used in the rubber industrial field such as the softening agent, tackifier, antioxidant, silane coupler, vulcanization accelerator, vulcanizing agent within the amount that does not adversely affect the object of the present invention. As the above-described compounding agents, commercially available products can be favorably used. The above-described rubber composition can be manufactured by adding the low-molecular-weight conjugated diene-based polymer (B) and the various compounding agents selected as required depending on applications to the rubber component (A), and performing kneading, warming, and extruding.

The run-flat tire according to the present invention can be manufactured by applying the rubber composition containing the rubber component (A) and the low-molecular-weight conjugated diene-based polymer (B) to at least one of the bead filler 7 and the side-reinforcing rubber layer 8 to form a raw tire, and then, vulcanizing the formed raw tire through a general method. Noted that, in the run-flat tire according to the present invention, it may be possible to use, as a gas to be filled in the tire, an air generally used or having a changed oxygen partial pressure, or inert gas such as nitrogen.

EXAMPLE

Examples

Next, by giving examples, the present invention will be described in more detail. However, the present invention is not limited to the examples below.

Example 1 of Manufacturing Polymer (A-1)

A cyclohexane of 300 g, 1,3-butadiene of 40 g, styrene of 13 g, ditetrahydrofuryl propane of 0.25 mmol were charged into a pressure glass vessel of 800 mL dried and purged with nitrogen; n-butyl lithium (n-BuLi) of 0.25 mmol was added therein; and then, polymerization reaction was performed at 50° C. for 1.5 hours. The polymerization conversion ratio was approximately 100%. Thereafter, 0.06 mmol of tin tetrachloride was promptly added to the polymerization reaction system as the modifier, and modification reaction was performed at 50° C. for 30 minutes. Then, 0.5 mL of an isopropanol solution containing 5% by mass of 2,6-di-t-butyl-p-cresol (BHT) was added to the polymerization system to stop the polymerization reaction. Then, it was dried according to a usual manner to obtain a polymer (A-1).

Example of Manufacturing Polymer (B-1)

A cyclohexane of 300 g, 1,3-butadiene of 40 g, ditetrahydrofuryl propane of 13.2 mmol were charged into a pressure glass vessel of 800 mL dried and purged with nitrogen; n-butyl lithium (n-BuLi) of 13.2 mmol was added therein; and then, polymerization reaction was performed at 50° C. for 1.5 hours. The polymerization conversion ratio was approximately 100%. Then, 0.5 mL of an isopropanol solution containing 5% by mass of 2,6-di-t-butyl-p-cresol (BHT) was added to the polymerization system to stop the polymerization reaction. Then, it was dried according to a usual manner to obtain a polymer (B-1).

Example of Manufacturing Polymers (B-2) to (B-4)

Polymers (B-2) to (B-4) were synthesized in a similar manner to the example of manufacturing the above-described polymer (B-1) except that the amount of n-butyl lithium (n-BuLi) used was changed.

Example of Manufacturing Polymer (B-5)

A cyclohexane of 300 g, 1,3-butadiene of 42.5 g, styrene of 7.5 g, ditetrahydrofuryl propane of 0.80 mmol were charged into a pressure glass vessel of 800 mL dried and purged with nitrogen; n-butyl lithium (n-BuLi) of 26.4 mmol was added therein; and then, polymerization reaction was performed at 50° C. for 1.5 hours. The polymerization conversion ratio was approximately 100%. Then, 0.5 mL of an isopropanol solution containing 5% by mass of 2,6-di-t-butyl-p-cresol (BHT) was added to the polymerization system to stop the polymerization reaction. Then, it was dried according to a usual manner to obtain a polymer (B-5).

Example of Manufacturing Polymer (B-6) to (B-10)

Polymers (B-6) to (B-10) were synthesized in a similar manner to the example of manufacturing the above-described polymer (B-1) except that the amount of n-butyl lithium (n-BuLi) used and the amount of ditetrahydrofuryl propane used were changed.

For the polymers (A-1) and (B-1) to (B-10) manufactured as described above, the weight average molecular weights (Mw) and the micro structures were measured by using the method below. The results thereof are shown in Table 1.

(1) Weight Average Molecular Weight (Mw)

The weight average molecular weight (Mw) in terms of polystyrene standard was measured for each polymer through a gel permeation chromatography [GPC: HLC-8020 manufactured by TOSOH, column: GMH-XL manufactured by TOSOH (series of two columns), detector: differential refractometer (RI)] on the basis of a monodisperse polystyrene standard.

(2) Micro Structure

The micro structures of the polymers were obtained through an infrared method (Morello method).

TABLE 1

| | Weight average molecular weight (Mw) (×10³) | Styrene bonding amount (% by mass) | Vinyl bonding amount (%) |
|---|---|---|---|
| Polymer (A-1) | 570 | 20 | 55 |
| Polymer (B-1) | 8 | 0 | 60 |
| Polymer (B-2) | 2 | 0 | 60 |
| Polymer (B-3) | 4 | 0 | 60 |
| Polymer (B-4) | 15 | 0 | 60 |
| Polymer (B-5) | 4 | 15 | 30 |
| Polymer (B-6) | 4 | 0 | 20 |
| Polymer (B-7) | 4 | 0 | 30 |
| Polymer (B-8) | 4 | 0 | 40 |
| Polymer (B-9) | 4 | 0 | 50 |
| Polymer (B-10) | 4 | 0 | 85 |

Examples 1 to 12 and Comparative Examples 1 to 7

Run-flat tires having a structure illustrated in FIG. 1 with a size of 245/40R18 were manufactured by preparing rubber compositions having formulations shown in Tables 2 to 3, and applying the prepared rubber compositions to both the bead filler 7 and the side-reinforcing rubber layer 8.

[Evaluation]

For the rubber compositions prepared as described above, the viscosity and the tackiness of the unvulcanized rubber were evaluated through the following method. Further, for the tires manufactured as described above, the durability during run-flat traveling was evaluated through the following method. The results are shown in Tables 2 to 3.

(3) Viscosity of Unvulcanized Rubber

According to JIS K6300-1:2001, Mooney viscosity [$ML_{1+4}$ (130° C.)] was measured at 130° C., and the results are expressed by indices on the basis that Mooney viscosity of the prepared rubber of Comparative Example 1 is 100. The smaller index value represents the lower Mooney viscosity and more excellent processability.

(4) Tackiness of Unvulcanized Rubber

Tests were carried out according to JIS-T9233-3.8.6 (2) Mitsuhashi method (picma tack test). For each of Examples and Comparative Examples, a test piece having a width of 15 mm and a length of 100 mm were prepared. The surface of a disk-shaped adhesion portion having a diameter of 50 mm and a thickness of 14 mm and made of aluminum is cleaned with hexane, and dried at a room temperature for 30 minutes. Samples (test pieces) were adhered with a double-sided tape. By depressing a start button of a measurement device, the disk-shaped adhesion portion was lowered to bring the disk-shaped adhesion portion in contact with the samples. After the contact with a load of 500 gf for 30 seconds, the disk-shaped adhesion portion was elevated at a rate of 30 mm/sec. (Sample temperature, temperature of the disk-shaped adhesion portion, temperature of measurement room: 23° C.) Forces at the time when the disk-shaped adhesion portion is detached from the sample were measured five times, and average values thereof were obtained. The results are expressed by indices on the basis that the value of the rubber composition of Comparative Example 1 is 100. The larger index value represents the higher tackiness and more excellent processability.

(5) Durability During Run-Flat Traveling

The sample tires were each assembled with a rim at a room pressure, inflated at an inner pressure of 230 kPa, and left in a room at 38° C. for 24 hours. Then, a core of a valve is removed to make the inner pressure at an atmospheric pressure. Thereafter, a drum traveling test was conducted under a condition of a load of 5.19 kN (530kg), a speed of 89 km/h, and a room temperature of 38° C. Traveling distances until failure occurs were measured. The results thereof are expressed by indices on the basis that the traveling distance of Comparative Example 1 until failure occurs is 100. The larger index value represents the longer traveling distance until the failure occurs, and more excellent durability during run-flat traveling. Note that, in each examples, both the side-reinforcing rubber layer and the bead filler employ the above-described rubber composition.

TABLE 2

| | | | Comparative Example 1 | Comparative Example 2 | Comparative Example 3 | Example 1 | Example 2 | Example 3 | Comparative Example 4 | Comparative Example 5 | Example 4 | Comparative Example 6 |
|---|---|---|---|---|---|---|---|---|---|---|---|---|
| Type of low-molecular-weight conjugated diene-based polymer (B) | | | — | — | — | B-2 | B-3 | B-1 | B-4 | B-3 | B-5 | B-1 |
| Weight average molecular weight (Mw) (×10³) | | | — | — | — | 2 | 4 | 8 | 15 | 4 | 4 | 8 |
| Styrene bonding amount (mass %) | | | — | — | — | 0 | 0 | 0 | 0 | 0 | 15 | 0 |
| Vinyl bonding amount (%) | | | — | — | — | 60 | 60 | 60 | 60 | 60 | 30 | 60 |
| Composition | Rubber component (A) | NR *1 | 40 | 40 | 40 | 40 | 40 | 40 | 40 | — | 40 | 40 |
| | | SBR *2 Mass part | — | — | — | — | — | — | — | 40 | — | — |
| | | BR *3 | 60 | 60 | 60 | 60 | 60 | 60 | 60 | 60 | 60 | 60 |
| | Low-molecular-weight conjugated diene-based polymer (B) | | — | — | — | 10 | 10 | 10 | 10 | 10 | 10 | 10 |
| | Oil | | — | 10 | — | — | — | — | — | — | — | — |
| | Carbon black (FEF) | | 50 | 50 | 50 | 50 | 50 | 50 | 50 | 50 | 50 | 50 |
| | Tackifier *4 | | — | — | 5 | — | — | — | — | — | — | — |
| | Stearic acid | | 1 | 1 | 1 | 1 | 1 | 1 | 1 | 1 | 1 | 1 |
| | Zinc oxide | | 5 | 5 | 5 | 5 | 5 | 5 | 5 | 5 | 5 | 5 |
| | Antioxidant *5 | | 2 | 2 | 2 | 2 | 2 | 2 | 2 | 2 | 2 | 2 |
| | Vulcanization accelerator *6 | | 2.2 | 2.2 | 2.2 | 2.2 | 2.2 | 2.2 | 2.2 | 2.2 | 2.2 | 2.2 |
| | Sulfur | | 5 | 5 | 5 | 5 | 5 | 5 | 5 | 5 | 5 | 2.5 |
| Viscosity of unvulcanized rubber (index) | | | 100 | 83 | 91 | 80 | 79 | 80 | 102 | 80 | 88 | 82 |
| Tackiness of unvulcanized rubber (index) | | | 100 | 104 | 145 | 140 | 142 | 143 | 139 | 134 | 136 | 140 |
| Run-flat durability (index) | | | 100 | 81 | 83 | 129 | 132 | 137 | 144 | 102 | 121 | 104 |

TABLE 3

|  |  | Example 5 | Example 2 | Example 6 | Example 7 | Comparative Example 7 | Example 8 | Example 9 | Example 10 | Example 11 | Example 12 |
|---|---|---|---|---|---|---|---|---|---|---|---|
| Type of low-molecular-weight conjugated diene-based polymer (B) | | B-3 | B-3 | B-3 | B-3 | B-3 | B-6 | B-7 | B-8 | B-9 | B-10 |
| Weight average molecular weight (Mw) (×10³) | | 4 | 4 | 4 | 4 | 4 | 4 | 4 | 4 | 4 | 4 |
| Styrene bonding amount (mass %) | | 0 | 0 | 0 | 0 | 0 | 0 | 0 | 0 | 0 | 0 |
| Vinyl bonding amount (%) | | 60 | 60 | 60 | 60 | 60 | 20 | 30 | 40 | 50 | 85 |
| Composition | Rubber component (A) NR *1 Mass part | 40 | 40 | 40 | 40 | 40 | 40 | 40 | 40 | 40 | 40 |
| | SBR *2 | — | — | — | — | — | — | — | — | — | — |
| | BR *3 | 60 | 60 | 60 | 60 | 60 | 60 | 60 | 60 | 60 | 60 |
| | Low-molecular-weight conjugated diene-based polymer (B) | 3 | 10 | 20 | 30 | 40 | 10 | 10 | 10 | 10 | 10 |
| | Oil | — | — | — | — | — | — | — | — | — | — |
| | Carbon black (FEF) | 50 | 50 | 50 | 50 | 50 | 50 | 50 | 50 | 50 | 50 |
| | Tackifier *4 | — | — | — | — | — | — | — | — | — | — |
| | Stearic acid | 1 | 1 | 1 | 1 | 1 | 1 | 1 | 1 | 1 | 1 |
| | Zinc oxide | 5 | 5 | 5 | 5 | 5 | 5 | 5 | 5 | 5 | 5 |
| | Antioxidant *5 | 2 | 2 | 2 | 2 | 2 | 2 | 2 | 2 | 2 | 2 |
| | Vulcanization accelerator *6 | 2.2 | 2.2 | 2.2 | 2.2 | 2.2 | 2.2 | 2.2 | 2.2 | 2.2 | 2.2 |
| | Sulfur | 5 | 5 | 5 | 5 | 5 | 5 | 5 | 5 | 5 | 5 |
| Viscosity of unvulcanized rubber (index) | | 90 | 79 | 70 | 65 | 60 | 74 | 76 | 75 | 81 | 107 |
| Tackiness of unvulcanized rubber (index) | | 121 | 142 | 150 | 152 | 148 | 134 | 140 | 131 | 137 | 125 |
| Run-flat durability (index) | | 120 | 132 | 136 | 121 | 101 | 118 | 128 | 135 | 130 | 133 |

*1 weight average molecular weight in terms of polystyrene standard = 1,500,000.
*2 polymer (A-1).
*3 made by JSR corporation, BR01, the weight average molecular weight in terms of polystyrene standard = 550,000.
*4 made by BASF corporation, Koresin.
*5 N-(1,3-dimethyl butyl)-N'-phenyl-p-phenylenediamine.
*6 NS: N-tert-butyl-2-benzothiazyl-sulfenic amide.

From comparison between Comparative Examples 1 to 3, it can be understood that the durability during run-flat traveling largely deteriorates, although the viscosity and the tackiness of the unvulcanized rubber improve by adding the softening agent such as oil or tackifier to the rubber composition. On the other hand, from the results of Examples 1 to 4, it can be understood that, by employing the rubber composition obtained by mixing, at a specific ratio, sulfur with the low-molecular-weight conjugated diene-based polymer (B) having the weight average molecular weight in terms of polystyrene standard in the range of 2,000 to 10,000 measured using a gel permeation chromatography in place of the softening agent such as oil or tackifier, it is possible to improve the durability during run-flat traveling while maintaining the processability of the rubber composition at a higher level. Noted that it can be understood that, in Example 4, the ratio in the styrene unit of the low-molecular-weight conjugated diene-based polymer (B) is undesirably high, and hence, the effect of improving the durability during run-flat traveling cannot be sufficiently obtained. Further, in Comparative Example 6, it can be understood that the amount of sulfur in the rubber composition is undesirably low, and hence, the effect of improving the durability during run-flat traveling cannot be sufficiently obtained.

Further, it can be understood that, in Comparative Example 4, the weight average molecular weight in terms of polystyrene standard of the low-molecular-weight conjugated diene-based polymer (B) falls outside the range of 2,000 to 10,000, and hence, the effect of improving the processability cannot be obtained; and in Comparative Example 5, the rubber component (A) does not contain the natural rubber and/or polyisoprene rubber, and hence, the durability during run-flat traveling deteriorates.

EXPLANATION OF REFERENCE CHARACTERS

1 Bead portion
2 Side wall portion
3 Tread
4 Radial carcass
4a Folded carcass ply
4b Down carcass ply
5 Belt
6 Bead core
7 Bead filler
8 Side-reinforcing rubber layer

The invention claimed is:

1. A run-flat tire comprising a side wall portion, a tread, a carcass, a bead core, and a bead filler,
said bead filler employing a rubber composition obtained by adding 3 to 10 parts by mass of sulfur and 20 to 30 parts by mass of a low-molecular-weight conjugated diene-based polymer (B) having a weight average molecular weight in terms of polystyrene standard in the range of 4,000 to 8,000 measured with a gel permeation chromatography and which is at least one of a homopolymer of 1,3-butadiene and a poly(styrene-co-1,3-butadiene), to 100 parts by mass of a rubber component (A) containing at least a natural rubber or polyisoprene rubber and having a weight average molecular weight in terms of polystyrene standard in the range of 150,000 to 2,000,000 measured with the gel permeation chromatography,
wherein in the polymer (B), the percentage of an aromatic vinyl compound unit relative to all monomer units is less than 4% by mass, and the percentage of a vinyl bonding amount in the conjugated diene compound moiety is in the range of 30% to 80%, and wherein the rubber component (A) further comprises at least one type selected from the group consisting of a styrene-butadiene copolymer rubber and a polybutadiene rubber.

2. The run-flat tire according to claim 1, wherein the low-molecular-weight conjugated diene-based polymer (B) is the homopolymer of 1,3-butadiene.

3. The run-flat tire according to claim 1, wherein the rubber composition further contains a carbon black and/or silica.

4. A run-flat tire comprising a side wall portion, a tread, a carcass, and a side-reinforcing rubber layer, said side-reinforcing rubber layer employing a rubber composition obtained by adding 3 to 10 parts by mass of sulfur and 20 to 30 parts by mass of a low-molecular-weight conjugated diene-based polymer (B) having a weight average molecular weight in terms of polystyrene standard in the range of 4,000 to 8,000 measured with a gel permeation chromatography and which is at least one of a homopolymer of 1,3-butadiene and a poly(styrene-co-1,3-butadiene), to 100 parts by mass of a rubber component (A) containing at least a natural rubber or polyisoprene rubber and having a weight average molecular weight in terms of polystyrene standard in the range of 150,000 to 2,000,000 measured with the gel permeation chromatography, wherein in the polymer (B), the percentage of an aromatic vinyl compound unit relative to all monomer units is less than 4% by mass, and the percentage of a vinyl bonding amount in the conjugated diene compound moiety is in the range of 30% to 80%, and wherein the rubber component (A) further comprises at least one type selected from the group consisting of a styrene-butadiene copolymer rubber and a polybutadiene rubber.

5. A run-flat tire comprising a side wall portion, a tread, a carcass, a bead core, a bead filler, and a side-reinforcing rubber layer, at least one of said bead filler and said side-reinforcing rubber layer employing a rubber composition obtained by adding 3 to 10 parts by mass of sulfur and 20 to 30 parts by mass of a low-molecular-weight conjugated diene-based polymer (B) having a weight average molecular weight in terms of polystyrene standard in the range of 4,000 to 8,000 measured with a gel permeation chromatography and which is at least one of a homopolymer of 1,3-butadiene and a poly(styrene-co-1,3-butadiene), to 100 parts by mass of a rubber component (A) containing at least a natural rubber or polyisoprene rubber and having a weight average molecular weight in terms of polystyrene standard in the range of 150,000 to 2,000,000 measured with the gel permeation chromatography, wherein in the polymer (B), the percentage of an aromatic vinyl compound unit relative to all monomer units is less than 4% by mass, and the percentage of a vinyl bonding amount in the conjugated diene compound moiety is in the range of 30% to 80%, and wherein the rubber component (A) further comprises at least one type selected from the group consisting of a styrene-butadiene copolymer rubber and a polybutadiene rubber.

* * * * *